United States Patent
Revanur et al.

(10) Patent No.: US 9,216,391 B2
(45) Date of Patent: Dec. 22, 2015

(54) MEMBRANES HAVING ALIGNED 1-D NANOPARTICLES IN A MATRIX LAYER FOR IMPROVED FLUID SEPARATION

(75) Inventors: Ravindra Revanur, Fremont, CA (US);
Valentin Lulevich, Berkeley, CA (US);
Il Juhn Roh, San Ramon, CA (US);
Jennifer E. Klare, Berkeley, CA (US);
Sangil Kim, Pleasanton, CA (US);
Aleksandr Noy, San Carlos, CA (US);
Olgica Bakajin, San Leandro, CA (US)

(73) Assignee: Porifera, Inc., Hayward, CA (US)

( * ) Notice: Subject to any disclaimer, the term of this patent is extended or adjusted under 35 U.S.C. 154(b) by 926 days.

(21) Appl. No.: 13/428,843

(22) Filed: Mar. 23, 2012

(65) Prior Publication Data

US 2012/0241371 A1    Sep. 27, 2012

Related U.S. Application Data

(60) Provisional application No. 61/465,871, filed on Mar. 25, 2011, provisional application No. 61/627,718, filed on Oct. 17, 2011.

(51) Int. Cl.
*B01D 39/00* (2006.01)
*B01D 39/14* (2006.01)
(Continued)

(52) U.S. Cl.
CPC ............ *B01D 69/148* (2013.01); *B01D 53/228* (2013.01); *B01D 67/0079* (2013.01);
(Continued)

(58) Field of Classification Search
CPC ........ B82Y 30/00; B82Y 40/00; B82Y 99/00;
B01D 67/0079; B01D 71/021; B01D 69/141;
B01D 53/228; B01D 69/12; B01D 69/148;
B01D 2323/36; B01D 69/125; B01D 39/06;
H03M 5/18
USPC ...................... 210/502.1, 500.38, 490; 264/41
See application file for complete search history.

(56) References Cited

U.S. PATENT DOCUMENTS 4,326,509 A    4/1982 Usukura
4,428,720 A    1/1984 Van Erden et al.
(Continued)

FOREIGN PATENT DOCUMENTS

CN    101228214 A    7/2008
JP    S55149682 A    11/1980
(Continued)

OTHER PUBLICATIONS

Paul L. McEuen et al, Single-Walled Nanotubes Electronics; IEEE Transacactions on Nanotechnology, vol. 1 No. 1 Mar. 2002.*
(Continued)

*Primary Examiner* — Ana Fortuna
(74) *Attorney, Agent, or Firm* — Dorsey & Whitney LLP

(57) ABSTRACT

Membranes for fluid separation are disclosed. These membranes have a matrix layer sandwiched between an active layer and a porous support layer. The matrix layer includes 1-D nanoparticles that are vertically aligned in a porous polymer matrix, and which substantially extend through the matrix layer. The active layer provides species-specific transport, while the support layer provides mechanical support. A matrix layer of this type has favorable surface morphology for forming the active layer. Furthermore, the pores that form in the matrix layer tend to be smaller and more evenly distributed as a result of the presence of aligned 1-D nanoparticles. Improved performance of separation membranes of this type is attributed to these effects.

23 Claims, 8 Drawing Sheets

(51) Int. Cl.
- *B01D 69/14* (2006.01)
- *B01D 53/22* (2006.01)
- *B01D 67/00* (2006.01)
- *B01D 69/10* (2006.01)
- *B01D 69/12* (2006.01)
- *B01D 71/56* (2006.01)
- *B01D 71/70* (2006.01)
- *B82Y 30/00* (2011.01)
- *B82Y 40/00* (2011.01)
- *B01D 61/00* (2006.01)
- *B01D 61/02* (2006.01)
- *B01D 71/02* (2006.01)

(52) U.S. Cl.
CPC .............. *B01D69/10* (2013.01); *B01D 69/12* (2013.01); *B01D 69/125* (2013.01); *B01D 71/56* (2013.01); *B01D 71/70* (2013.01); *B82Y 30/00* (2013.01); *B82Y 40/00* (2013.01); *B01D 61/002* (2013.01); *B01D 61/025* (2013.01); *B01D 67/006* (2013.01); *B01D 67/009* (2013.01); *B01D 71/021* (2013.01); *B01D 2323/40* (2013.01); *B01D 2325/48* (2013.01)

(56) References Cited

U.S. PATENT DOCUMENTS

| | | | |
|---|---|---|---|
| 4,454,176 A | 6/1984 | Buckfelder et al. | |
| 4,618,533 A | 10/1986 | Steuck | |
| 5,593,738 A | 1/1997 | Ihm et al. | |
| 6,261,879 B1 | 7/2001 | Houston et al. | |
| 6,406,626 B1 | 6/2002 | Murakami et al. | |
| 6,413,070 B1 | 7/2002 | Meyering et al. | |
| 6,513,666 B2 | 2/2003 | Meyering et al. | |
| 6,755,970 B1 | 6/2004 | Knappe et al. | |
| 6,849,184 B1 | 2/2005 | Lampi et al. | |
| 6,884,375 B2 | 4/2005 | Wang et al. | |
| 6,992,051 B2 * | 1/2006 | Anderson .............. | 510/205 |
| 7,205,069 B2 | 4/2007 | Smalley et al. | |
| 7,445,712 B2 | 11/2008 | Herron | |
| 7,611,628 B1 | 11/2009 | Hinds, III et al. | |
| 7,627,938 B2 | 12/2009 | Kim et al. | |
| 7,901,578 B2 | 3/2011 | Pruet | |
| 8,029,857 B2 * | 10/2011 | Hoek et al. ............ | 427/245 |
| 8,038,887 B2 | 10/2011 | Bakajin et al. | |
| 8,177,978 B2 * | 5/2012 | Kurth et al. ............ | 210/652 |
| 8,358,717 B2 | 1/2013 | Park et al. | |
| 8,518,276 B2 * | 8/2013 | Striemer et al. ......... | 216/2 |
| 8,567,612 B2 * | 10/2013 | Kurth et al. ............ | 210/500.38 |
| 2002/0063093 A1 | 5/2002 | Rice et al. | |
| 2003/0038074 A1 | 2/2003 | Patil | |
| 2004/0004037 A1 | 1/2004 | Herron | |
| 2004/0071951 A1 | 4/2004 | Jin | |
| 2005/0142385 A1 | 6/2005 | Jin | |
| 2006/0144789 A1 | 7/2006 | Cath et al. | |
| 2006/0233694 A1 | 10/2006 | Sandhu et al. | |
| 2008/0149561 A1 | 6/2008 | Chu et al. | |
| 2008/0210370 A1 | 9/2008 | Smalley et al. | |
| 2008/0223795 A1 | 9/2008 | Bakajin et al. | |
| 2008/0236804 A1 * | 10/2008 | Cola et al. .............. | 165/185 |
| 2008/0290020 A1 | 11/2008 | Marand et al. | |
| 2009/0078640 A1 | 3/2009 | Chu et al. | |
| 2009/0214847 A1 | 8/2009 | Maruyama et al. | |
| 2009/0250392 A1 | 10/2009 | Thorsen et al. | |
| 2009/0272692 A1 | 11/2009 | Kurth et al. | |
| 2009/0283475 A1 | 11/2009 | Hylton et al. | |
| 2009/0308727 A1 | 12/2009 | Kirts | |
| 2009/0321355 A1 | 12/2009 | Ratto et al. | |
| 2010/0025330 A1 | 2/2010 | Ratto et al. | |
| 2010/0051538 A1 | 3/2010 | Freeman et al. | |
| 2010/0059433 A1 | 3/2010 | Freeman et al. | |
| 2010/0062156 A1 | 3/2010 | Kurth et al. | |
| 2010/0140162 A1 | 6/2010 | Jangbarwala | |
| 2010/0155333 A1 | 6/2010 | Husain et al. | |
| 2010/0206811 A1 | 8/2010 | Ng et al. | |
| 2010/0212319 A1 | 8/2010 | Donovan | |
| 2010/0224550 A1 | 9/2010 | Herron | |
| 2010/0224561 A1 | 9/2010 | Marcin | |
| 2010/0320140 A1 | 12/2010 | Nowak et al. | |
| 2011/0036774 A1 | 2/2011 | McGinnis | |
| 2011/0057322 A1 | 3/2011 | Matsunaga et al. | |
| 2011/0073540 A1 | 3/2011 | McGinnis et al. | |
| 2011/0132834 A1 | 6/2011 | Tomioka et al. | |
| 2011/0186506 A1 | 8/2011 | Ratto et al. | |
| 2011/0220574 A1 | 9/2011 | Bakajin et al. | |
| 2011/0284456 A1 | 11/2011 | Brozell | |
| 2012/0043274 A1 | 2/2012 | Chi et al. | |
| 2012/0080378 A1 | 4/2012 | Revanur et al. | |
| 2012/0080381 A1 | 4/2012 | Wang et al. | |
| 2012/0241371 A1 * | 9/2012 | Revanur et al. ......... | 210/488 |
| 2012/0251521 A1 * | 10/2012 | Rostro et al. ........... | 424/125 |
| 2012/0273421 A1 | 11/2012 | Perry et al. | |
| 2013/0095241 A1 | 4/2013 | Lulevich et al. | |
| 2013/0203873 A1 | 8/2013 | Linder et al. | |
| 2014/0015159 A1 | 1/2014 | Lazar et al. | |
| 2014/0302579 A1 * | 10/2014 | Boulanger et al. ...... | 435/173.6 |

FOREIGN PATENT DOCUMENTS

| | | |
|---|---|---|
| JP | S5959213 A | 4/1984 |
| JP | 62-140620 | 6/1987 |
| JP | 2005-138028 | 6/2005 |
| JP | 2010094641 A | 4/2010 |
| WO | 99/62623 | 12/1999 |
| WO | 02/13955 A1 | 2/2002 |
| WO | 2009039467 A1 | 3/2009 |
| WO | WO 2009/035415 | 3/2009 |
| WO | 2009129354 A2 | 10/2009 |
| WO | 2009129354 A3 | 10/2009 |
| WO | 2010006196 A2 | 1/2010 |
| WO | 2010144057 A1 | 12/2010 |
| WO | 2011028541 A1 | 3/2011 |
| WO | 2012/135065 | 10/2012 |
| WO | 2013/059314 | 4/2013 |
| WO | 2014071238 A1 | 5/2014 |

OTHER PUBLICATIONS

International Search Report and Written Opinion dated Oct. 31, 2012 for PCT Application No. PCT/US2012/030449.

Akthakul, et al., "Antifouling polymer membranes with subnanometer size selectivity", Macromolecules 37, Sep. 3. 2004, pp. 7663-7668.

Cath, et al., "Forward osmosis: principles, applications and recent devlopments", Journal of Membrane Science 281, May 31, 2006, pp. 70-87.

Li, et al., "Electronic properties of multiwalled carbon nanotubes in an embedded vertical array", Applied Physics Letters, vol. 81, No. 5, 2002, pp. 910-912.

Mandal, et al., "Drug delivery system based on chronobiology—a review", Journal of Controlled Release 147, Aug. 4, 2010, pp. 314-325.

McCutcheon: et al., "Influence of membrane support layer hydrophobicity on water flux in osmotically driven membrane processes", Journal of Membrane Science, Mar. 2008, pp. 458-466.

Santus, et al., "Osmotic drug delivery: a review of the patent literature", Journal of Controlled Release 35, Jul. 1995, pp. 1-21.

Sotthivirat, et al., "Controlled porosity-osmotic pump pellets of a poorly water-soluble drug using sulfobutylether-b-cyclodestrin, (SBE)_7M-b-CD, as a solubilizing and osmotic agent", Journal of Pharmaceutical Sciences, vol. 96, No. 9, Sep. 2007, pp. 2364-2374.

Yip, et al., "High Performance Thin-Film Composite Forward Osmosis Membrane", Environmental Science and Technology, Apr. 21, 2010, pp. 3812-3818.

Zhao, et al., "Modification of porous poly (vinylidene fluoride) membrane using amphiphilic polymers with different structures in phase inversion process", Journal of Membrane Science 310, Mar. 2008, pp. 567-576.

Extended EP search report & Written Opinion dated May 15, 2015 for EP appln No. 11831039.0.

* cited by examiner

MEMBRANES HAVING ALIGNED 1-D NANOPARTICLES IN A MATRIX LAYER FOR IMPROVED FLUID SEPARATION

CROSS REFERENCE TO RELATED APPLICATIONS

This application claims the benefit of U.S. provisional patent application 61/465,871, filed on Mar. 25, 2011, entitled "Reinforced thin-film composite hydrophilic membranes for forward osmosis, hydrophilic hollow fiber membranes for forward osmosis, and reinforced aligned carbon nanotube membranes for liquid and gas separations", and hereby incorporated by reference in its entirety. This application also claims the benefit of U.S. provisional patent application 61/627,718, filed on Oct. 17, 2011, entitled "Preparation of aligned carbon nanotube membranes for water and gas separation applications", and hereby incorporated by reference in its entirety.

GOVERNMENT SPONSORSHIP

This invention was made with Government support under contract number DE-AR0000025 awarded by the Department of Energy, under contract number W911NF-09-C-0079 awarded by the Department of Defense, and under contract number IIP-1058572 awarded by the National Science Foundation. The Government has certain rights in this invention.

FIELD OF THE INVENTION

This invention relates to permeable membranes for gas and/or liquid separation.

BACKGROUND

Carbon nanotubes (CNTs) have been considered in connection with permeable membranes for fluid separation for some time. Such membranes often rely on unusual transport properties of fluids through the nanotubes to improve performance. For example, enhanced transport through carbon nanotubes has been considered in U.S. Pat. No. 8,038,887.

However, it remains relatively difficult to fabricate permeable membranes having carbon nanotubes (CNTs) as the active material for separation. One significant reason for this is that active layers in permeable membranes are subject to numerous requirements (e.g., reliability, fouling resistance, high flux, good separation capability, etc.) and it can be difficult to meet these requirements with active layers that include carbon nanotubes. Another issue that can arise with such membranes is that CNTs may not provide sufficient separation capability. For example, small ions are difficult to filter out with CNTs.

Accordingly, it would be an advance in the art to provide high-performance separation membranes that are easier to fabricate.

SUMMARY

In this work, we have found that an aligned carbon nanotube mixed matrix membrane with a barrier layer has improved performance. FIG. 1a shows an example of this structure. This membrane includes a barrier layer 102 (also referred to as the active layer) that serves to separate solute from solvent. This barrier layer may be for either gas or liquid filtration. Underneath the barrier layer is a matrix layer 104 that includes aligned 1-D nanoparticles (one of which is referenced as 108) in a porous polymer. One of the pores is referenced as 110. The polymer may be any polymer. Underneath matrix layer 104 is a porous support layer 106 that provides additional mechanical support.

We have found, surprisingly, that including matrix layer 104 with its aligned 1-D nanoparticles in a separation membrane (e.g., as shown on FIG. 1a) can significantly improve membrane performance. Several factors are believed to contribute to this improved performance. First, this matrix layer appears to provide improved conditions for formation of the barrier layer. Second, this matrix layer appears to provide a pore structure more conducive to increased flow.

For formation of the barrier layer (which can be referred to as the IP layer in some embodiments), the properties of the surface on which it is deposited are important, especially for interfacial polymerization (IP), which is often a preferred approach for fabricating the barrier layer. Preferably, this surface is relatively flat and smooth, with small, evenly distributed pores. We have found that an aligned 1-D nanoparticle matrix layer (e.g., 104 on FIG. 1a) can provide such favorable surfaces for formation of the barrier layer. FIGS. 2a-b show an example, where FIG. 2a is a top view image and FIG. 2b is a side view image of a matrix layer 104 including aligned 1-D nanoparticles.

The pores formed within the 1-D nanoparticle matrix layer are smaller in size and are more uniform in distribution as a result of the presence of the aligned 1-D nanoparticles. These differences have been confirmed with SEM analysis. Due to these improved characteristics, flow rate through the membrane can be improved. Pores can be formed in the matrix layer through methods such as phase inversion, drying, or etching. In a phase inversion process, a layer of polymer dissolved in a solvent is immersed in a non-solvent, inducing precipitation of the polymer and the formation of voids within the layer. The structure of the voids is determined by kinetic and thermodynamic factors and is sensitive to concentration, temperature, and additives. The incorporation of aligned 1-D nanoparticles will change the solvent/nonsolvent dynamics and the precipitation of the polymer, resulting in a different structure than would be obtained by phase inversion in a matrix layer not including aligned 1-D nanoparticles. A surprising and noteworthy feature of this improvement of the pores in the matrix layer is that the improvement in flow rate does not depend exclusively on transport through the 1-D nanoparticles. Thus, 1-D nanoparticles other than CNTs can be employed, such as nanofibers, nanorods, etc. If CNTs are employed, they can be either open-ended or close-ended.

The improved membrane performance resulting from 1-D nanoparticles in the matrix layer can be seen by comparing an RO membrane including an aligned CNT matrix layer to a commercial RO Membrane (Filmtec SW30HS). The commercial SW30HS membrane has a measured pure water permeability of 1 lmh/bar, while the aligned CNT membrane with an IP layer has a measured pure water permeability 6 lmh/bar. Both membranes have over 96% rejection and can withstand pressures above 500 psi. This 600% improvement in performance is a result of a superior IP layer that is enabled by the nanotube porous matrix layer.

We also observe that the type, quality, and size of the CNTs influence the performance of the membrane. For smaller nanotubes, where the inner diameter is 2 nm, the pure water permeability is 4 lmh/bar. For larger nanotubes, where the inner diameter is 5 nm, the pure water permeability is 11 lmh/bar. These data show that the incorporation of aligned nanotubes, and the type of nanotube, has a significant influence in the produced porous matrix and the final membrane performance.

Similarly, in forward osmosis membranes with an IP barrier layer, membranes with aligned nanotubes in the matrix layer have improved performance relative to similar membranes without carbon nanotubes. Table 1 below provides some results.

TABLE 1

Performance data of forward osmosis membrane with a polyamide barrier layer with and without carbon nanotubes in the matrix layer. (Data collected using 1.5M NaCl draw solution against DI water at room temperature.)

| | Measurement | Permeance (LMH) | Reverse Salt Flux (g/L) |
|---|---|---|---|
| FO Membrane without CNTs | Skin to water | 35-50 | 0.05-0.5 |
| FO Membrane without CNTs | Skin to draw | 60-90 | 0.05-0.6 |
| FO Membrane with aligned CNTs | Skin to water | 42-70 | 0.2-1.0 |
| FO Membrane with aligned CNTs | Skin to draw | 80-150 | 0.1-1.0 |

Here, LMH is short for "liters per square meter per hour", "skin to water" refers to measurements taken with the barrier layer (i.e., the skin) facing the fresh water side of the separation, while "skin to draw" refers to measurements taken with the barrier layer facing the draw solution side of the separation.

This approach is broadly applicable to any gas or liquid separation, including but not limited to: forward osmosis, reverse osmosis, gas separation, and solute-solvent separation in general. Gas separation applications can be further extended to carbon capture and sequestration.

DETAILED DESCRIPTION

Figure 1A:
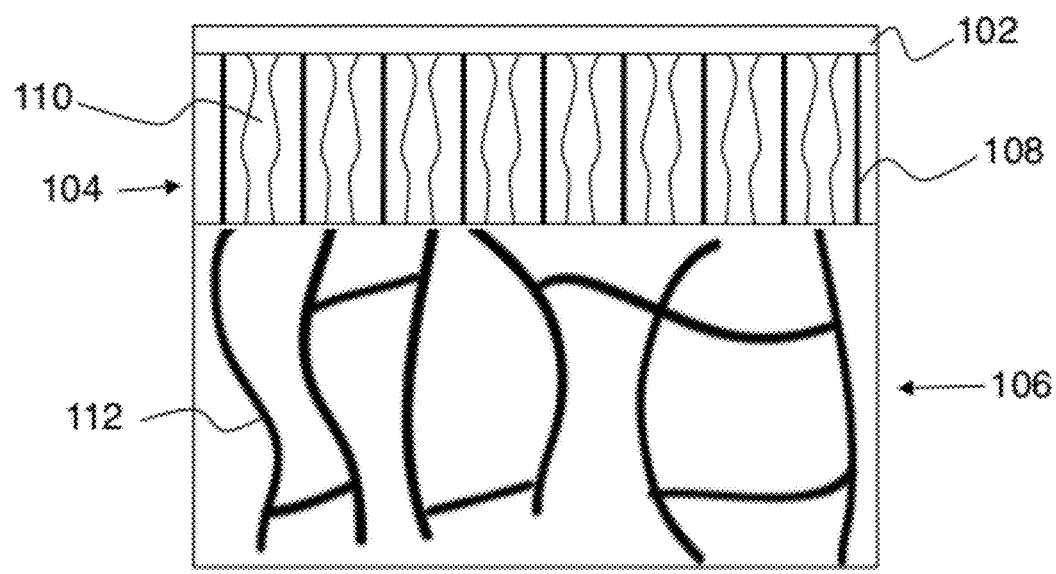
FIGS. 1a-b show side and top views of an embodiment of the invention.
Figure 1B:
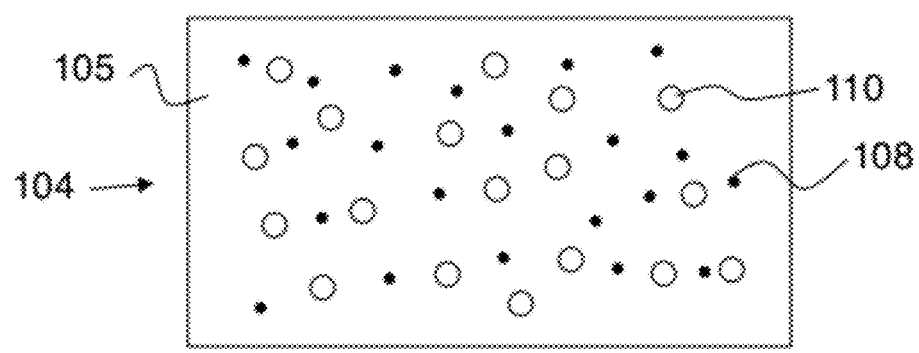
Figure 2A:
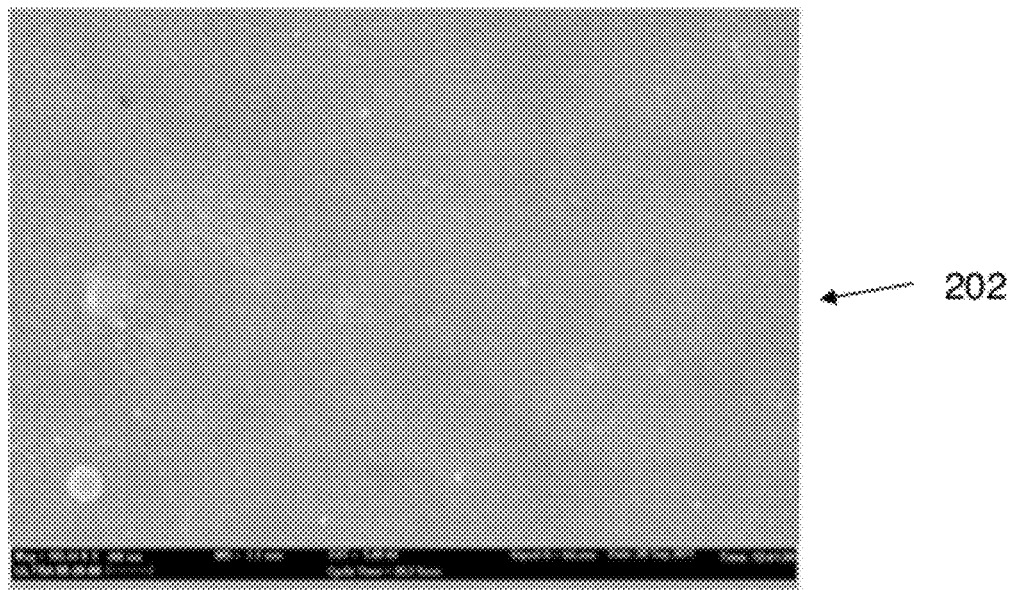
FIGS. 2a-b show top and side images of a porous matrix layer including aligned 1-D nanoparticles.
Figure 2B:
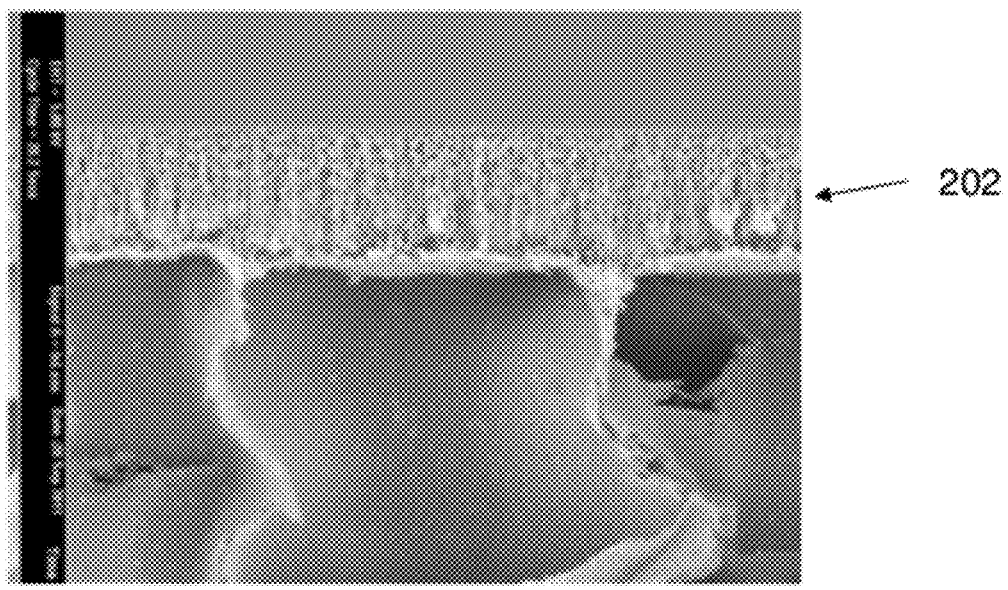

FIG. 1a shows a side view of an embodiment of the invention. FIG. 1b shows a corresponding top view of matrix layer 104 by itself. As indicated above, the membrane of FIGS. 1a-b includes a porous support layer 106, a matrix layer 104, and an active polymer layer 102. Matrix layer 104 is disposed on porous support layer 106 and includes a porous matrix polymer 105 and two or more 1-D nanoparticles disposed in the porous matrix polymer. One of the 1-D nanoparticles is referenced as 108, and one of the pores is referenced as 110. The 1-D nanoparticles are substantially vertically aligned (as shown), and the 1-D nanoparticles substantially extend through matrix layer 104 (also as shown). Active polymer layer 102 and the porous matrix polymer 105 have different compositions. Active layer 102 provides species specific fluid transport. On FIG. 1a, the porosity of porous support layer 106 is schematically shown by referencing solid parts of the layer with reference number 112 (i.e., the pores in layer 106 are the spaces between the heavy lines).

Any kind of 1-D nanoparticle can be employed in embodiments of the invention. Here, a 1-D nanoparticle is defined as a particle having at least two of its length (L), width (W) and height (H) being less than one micron, and having an aspect ratio (i.e., max(L,W,H)/min(L,W,H)) of 10 or more. Suitable nanoparticles include but are not limited to: open-ended carbon nanotubes, close-ended carbon nanotubes, carbon fibers, nanowires, nanorods, and other types of 1-D nano-objects.

Preferably, the thickness of matrix layer 104 is from about 100 nm to about 100 μm. Preferably, the thickness of active layer 102 is from about 0.3 nm to about 500 nm. Any polymer can be used as matrix polymer 105. Similarly, any material that provides species-specific gas or liquid transport can be used for active layer 102. Suitable materials for matrix polymer 105 include, but are not limited to: cellulose acetate, epoxy, polydimethysiloxane, polyvinylene fluoride, polysulfone, m- or p-polyaramids. Suitable materials for active layer 102 include, but are not limited to: polyamide, polyethylene glycol (PEG) and its co-polymers.

Active layer 102 can be a gas-selective layer. For example, layer 102 can include poly(amido amine) (PAMAM) or a PEG-nylon block co-polymer, polydimethylsiloxane (PDMS), chitosan, polytrimethylsilyl-1-pentyne (PTMSP), or both to impart the membrane with selectivity to $CO_2$ or other gases.

Alternatively, active layer 102 can be a liquid separation layer for solvent-solute separation. Various applications include, but are not limited to: forward osmosis, reverse osmosis, nanofiltration, pressure retarded osmosis, desalination, carbon capture and/or sequestration, etc.

Figure 3A:
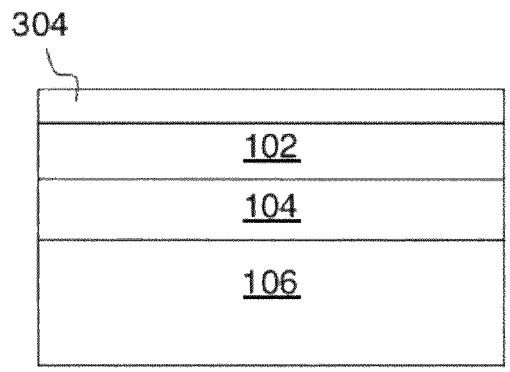
FIGS. 3a-d show some alternative embodiments of the invention.
Figure 3B:
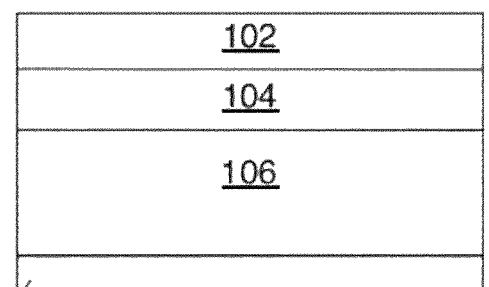

FIGS. 3a-b show embodiments of the invention having anti-fouling layers. The example of FIG. 3a shows an anti-fouling layer 304 disposed on active layer 102. The example of FIG. 3b shows an anti-fouling layer 304 disposed on porous support layer 106. These approaches can be combined, such that anti-fouling layers are disposed on both active layer 102 and on porous support layer 106.

Figure 3C:
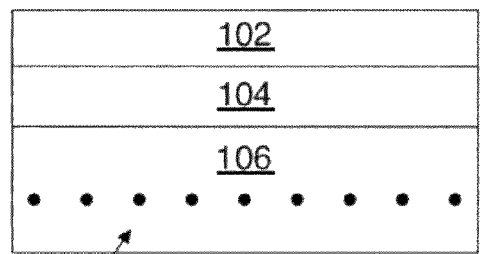
Figure 3D:
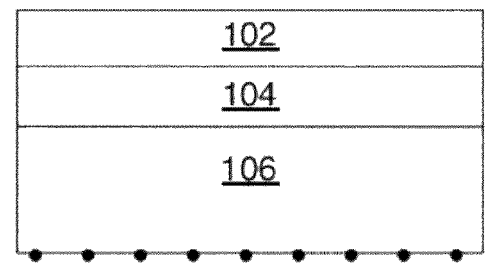

FIGS. 3c-d show embodiments of the invention having further mechanical support in the porous support layer. The example of FIG. 3c shows mechanical support 306 embedded in porous support layer 106, while the example of FIG. 3d shows mechanical support 106 disposed on a surface of porous support layer 106. Mechanical support 106 can be any structure suitable for providing mechanical support to porous support layer 106, such as a woven or non-woven mesh or fabric.

One approach for making membranes according to embodiments of the invention is as follows:

1) Form vertically aligned 1-D nanoparticles on a substrate;

2) Infiltrate a matrix precursor between the 1-D nanoparticles;

3) Form a porous polymer matrix from the matrix precursor to provide a matrix layer including the porous polymer matrix and the vertically aligned 1-D nanoparticles, where the 1-D nanoparticles substantially extend through the matrix layer;

4) Form a porous support layer on top of the matrix layer (here, steps 3 and 4 can be performed as two separate steps, or the matrix layer and porous support layer can be formed in a single step);

5) Separate the matrix layer from the substrate; and

6) Form an active layer on an exposed surface of the matrix layer, where the active layer provides species-specific fluid transport.

Two refinements of this basic process have also been considered, and are described below in connection with FIGS. 4a-h and FIGS. 5a-f. The process of FIGS. 4a-h features the formation of a roof layer to more precisely control the locations of the 1-D nanoparticles during fabrication. This process is especially useful in situations where the 1-D nanoparticles are open-ended nanotubes, because the roof layer facilitates opening the nanotubes during fabrication and protects the nanotubes from plugging by the polymer. The process of FIGS. 5a-f features the use of a conformal coating layer on the 1-D nanoparticles. The use of such a conformal coating allows for the use of a wider variety of materials as the matrix polymer precursor.

Figure 4A:
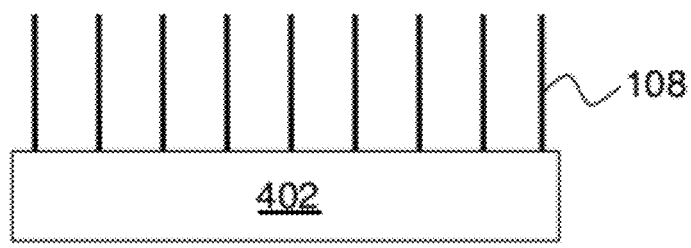
FIGS. 4a-h show a first fabrication sequence suitable for making embodiments of the invention.

FIG. 4a shows aligned 1-D nanoparticles 108 on a substrate 402. Methods for growing aligned 1-D nanoparticles on a substrate are known in the art, and any such method can be employed here.

Figure 4B:
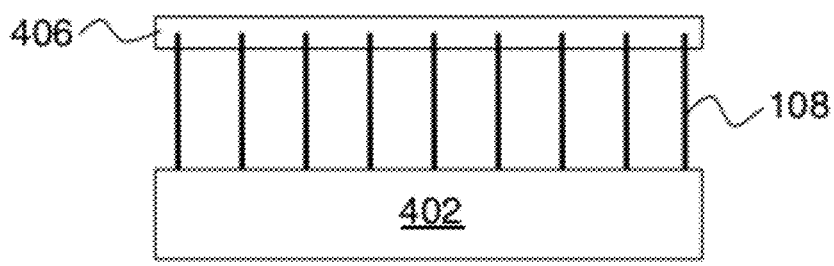

FIG. 4b shows the result of depositing a porous roof layer 406 on the 1-D nanoparticles, such that the roof layer and substrate are vertically separated.

Figure 4C:
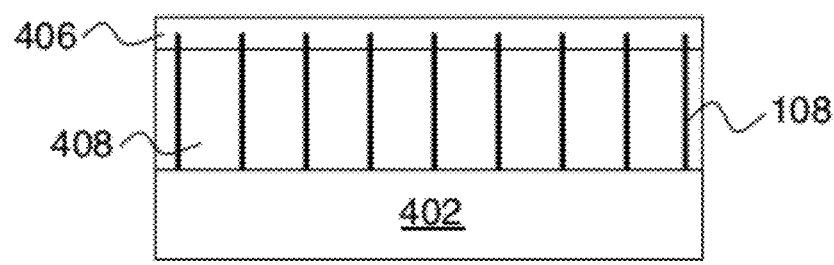

FIG. 4c shows the result of infiltrating a matrix polymer precursor 408 between the 1-D nanoparticles, and also between roof layer 406 and substrate 402. Preferably, matrix polymer precursor 408 is capable of flowing through roof layer 406 in order to facilitate infiltration.

Figure 4D:
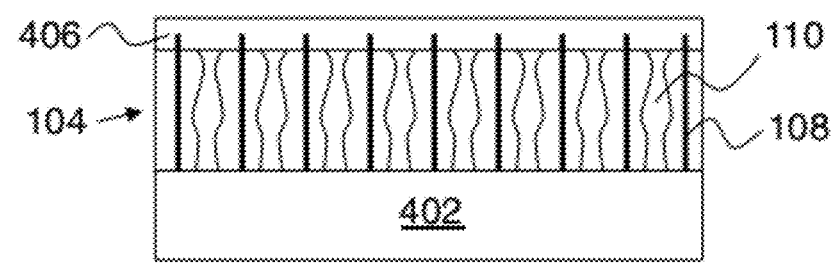

FIG. 4d shows the result of forming matrix layer 104 from matrix precursor 408. The polymerization is performed such that pores form in layer 104, one of which is referenced as 110. A phase inversion process is a preferred approach for forming matrix layer 104, but any approach for forming a porous layer from precursor 408 can be employed.

Figure 4E:
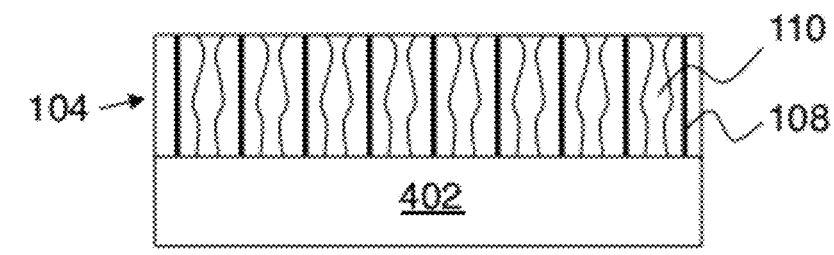

FIG. 4e shows the result of removing roof layer 406. This removal can be performed by any method. In some cases, reactive ion etching or mechanical removal is preferred. Mechanical removal of the roof layer can be helpful in cases where the 1-D nanoparticles are nanotubes, because mechanically removing the ends of nanotubes (as occurs when the roof layer is removed) can be an effective way of ensuring that the nanotubes are open-ended. This step is optional. Infiltration of the matrix precursor can also form an excess layer above roof layer 406, which forms porous support layer 106 after polymerization. In such cases, matrix layer 104 and porous support layer 106 are formed simultaneously in a single process step, and roof layer 406 remains in the final structure. In the resulting structures, porous roof layer 406 is regarded, by definition, as being part of the porous support layer.

Figure 4F:
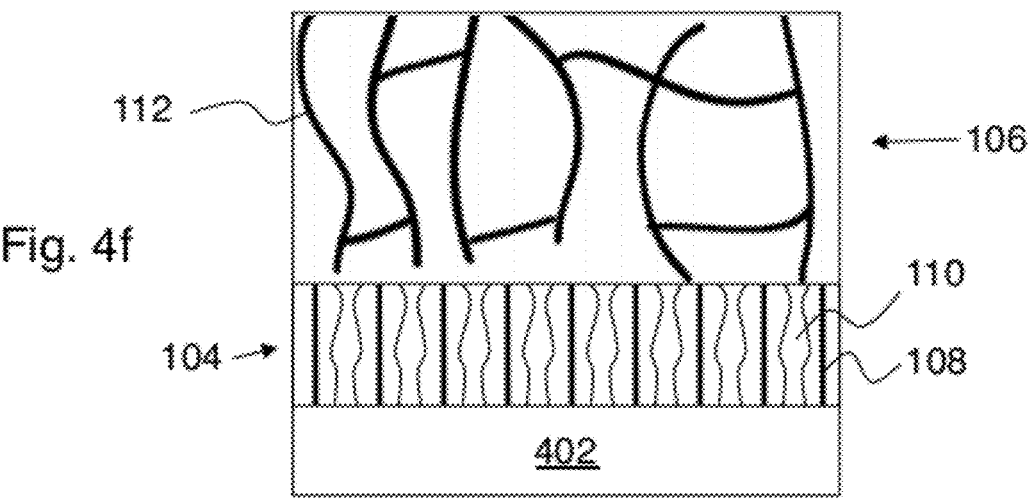

FIG. 4f shows the result of forming porous support layer 106 on matrix layer 104. A phase inversion process is a preferred approach for forming support layer 106, but any approach for forming a porous layer can be employed.

Figure 4G:
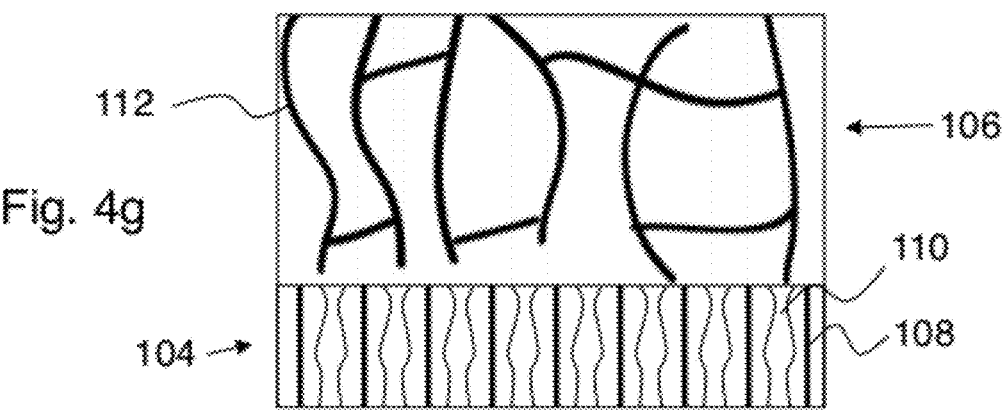

FIG. 4g shows the result of removing substrate 402 from the structure.

Figure 4H:
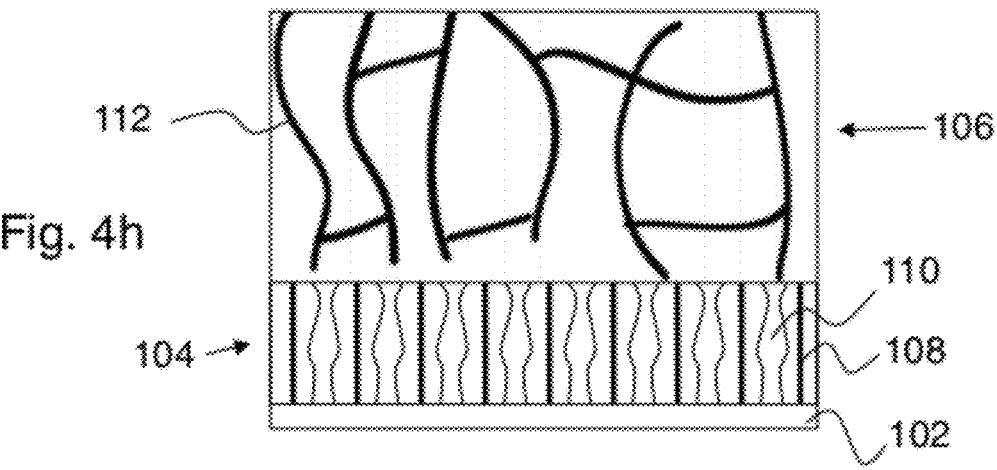

FIG. 4h shows the result of depositing active layer 102 on the exposed surface of matrix layer 104. Interfacial polymerization is a preferred approach for forming active layer 102, but any approach for depositing an active layer 102 on matrix layer 104 can be employed.

As indicated above, the process of FIGS. 4a-h is especially helpful in connection with 1-D nanoparticles that are nanotubes (e.g., carbon nanotubes). In this case, the target of these steps is to infiltrate the space outside of the carbon nanotubes with the matrix polymer, while providing access to the nanotube pore openings on the membrane surfaces. Matrix fill can be achieved by infiltrating (from solution, CVD or PVD) multiple organic materials (e.g., parylene, polymer solvents, in situ polymerization). Further considerations for the process of FIGS. 4a-h in connection with carbon nanotubes follow below.

One of the challenges in the post-infiltration processing is removing the excess layer on the membrane to expose the nanotube pores. The process of FIGS. 4a-h involves several key steps. First, before infiltrating the polymer, the carbon nanotube array gets covered with a roof layer 406 that keeps the nanotubes together during the pre-crosslinking processing steps. The main function of this roof layer, as described below, is to enable mechanical removing of the polymer solution from the top of the CNT array. Mechanical removal of the excess polymer layer is important for obtaining the matrix layer of a desired thickness or structure.

For good infiltration it is very important to achieve a highly porous roof layer, which can be either achieved by tuning the deposition conditions, or by post-deposition etching of the roof layer, or by post-deposition mechanical polishing of this layer. This roof layer on top of the CNT array can be made using CVD coated polymers (parylene), thin layer of graphite or other PVD deposited materials (silica, silicon nitride, gold, etc.).

For effective infiltration, the polymer precursor 408 should have low viscosity to fill the gaps between nanotubes. The easiest way to achieve the fill is to use in situ polymerization or crosslinking of polymers (PDMS, polystyrene, various epoxies). In this step low viscosity precursors 408 are added during infiltration step, the excess is mechanically removed from the membrane surface, and final crosslinking is performed after removal of polymer excess. Example 2 below gives a protocol for CNT membrane fabrication with PDMS polymeric fill.

After the polymer precursor 408 is cross-linked to form matrix layer 104 (using elevated temperature, UV or UV-Vis irradiation, etc.) the roof can be removed using plasma etching, polishing, or chemical treatment. At this stage, we can also add a mechanical support layer (e.g., 106 on FIG. 1a) to the membrane to improve its mechanical stability. A support layer with pore size significantly larger than the matrix pore size can be made using polymer phase inversion (polysulfone, polyaramides, polyvinylidene fluoride (PVDF), pyrrolidone (PVP), polyvinyldene fluoride, polyether sulfone etc.) and/or by melting or gluing a pre-fabricated mesh (ex: non-woven polyester, stainless steel mesh).

After attaching the support membrane, the resulting structure can be released from the wafer/substrate by using a mild acid etch (HF, HCl), or by mechanical removal of the wafer.

The resulting CNT membranes can be coated with a thin interfacially-polymerized polyamide layer to alter their rejection properties (See Example 3 for a sample protocol of this procedure).

Figure 5A:
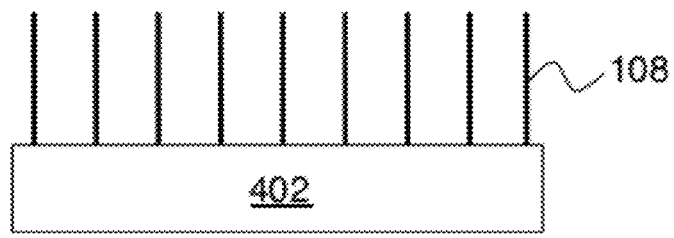
FIGS. 5a-f show a second fabrication sequence suitable for making embodiments of the invention.

FIG. 5a shows aligned 1-D nanoparticles 108 on a substrate 402. Methods for growing aligned 1-D nanoparticles on a substrate are known in the art, and any such method can be employed here.

Figure 5B:
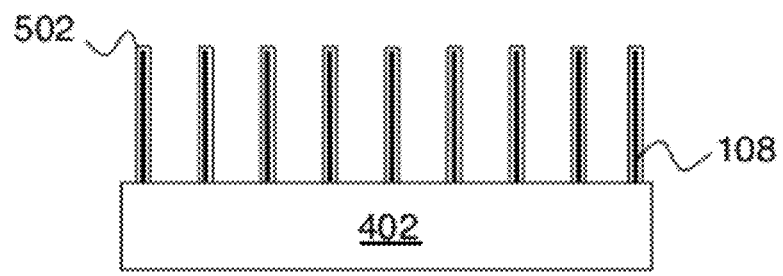

FIG. 5b shows the result of depositing a conformal polymer layer 502 on the 1-D nanoparticles, such that the 1-D nanoparticles are coated by the conformal layer. Conformal layer 502 may or may not also be deposited on substrate 402. Suitable materials for conformal layer 502 include, but are not limited to: polydopamine, polyethyleneimine, polyacrylic acid, poly(methyl methacrylate) or surfactants (e.g. sodium dodecyl sulfate or Triton X® (Dow)).

Figure 5C:
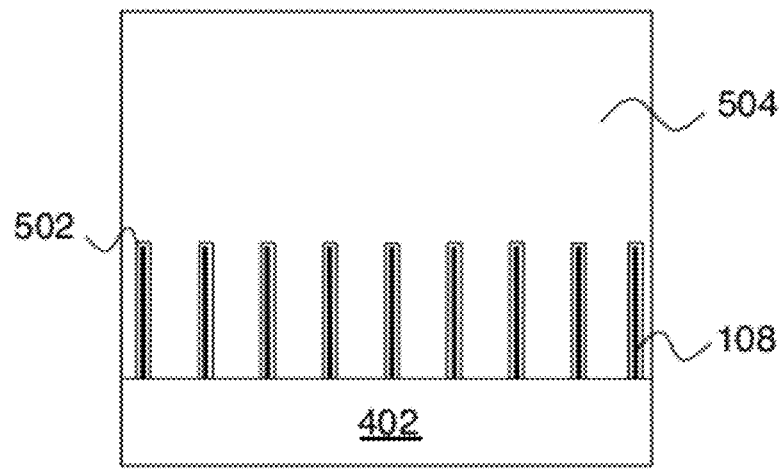

FIG. 5c shows the result of infiltrating a matrix polymer precursor 504 between the 1-D nanoparticles, and also above the 1-D nanoparticles.

Figure 5D:
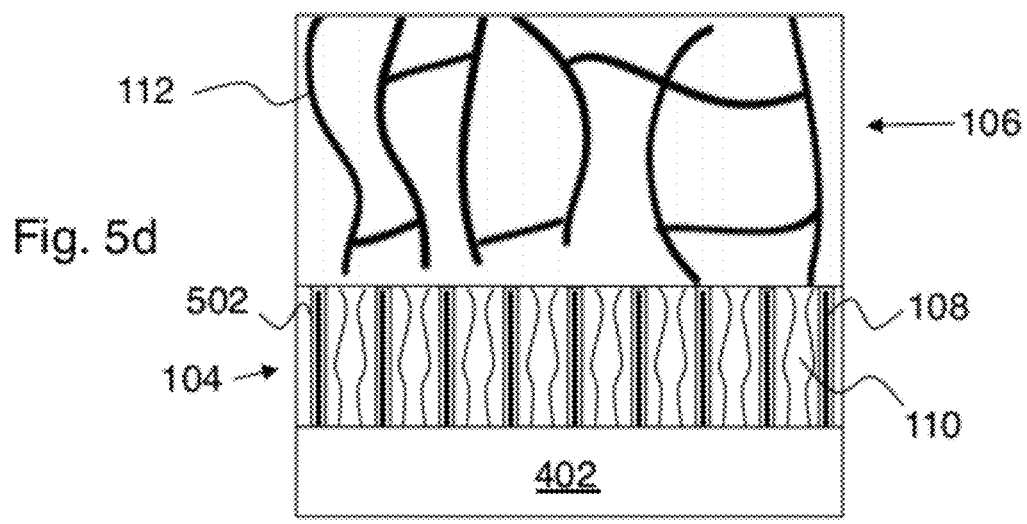

FIG. 5d shows the result of simultaneously forming matrix layer 104 and porous support layer 106 from matrix precursor 504. The polymerization is performed such that pores form in layers 104 and 106. One of the pores in matrix layer 104 is referenced as 110. A phase inversion process is a preferred approach for simultaneously forming matrix layer 104 and porous support layer 106, but any approach for forming porous layer 104 and 106 from precursor 504 can be employed.

Figure 5E:
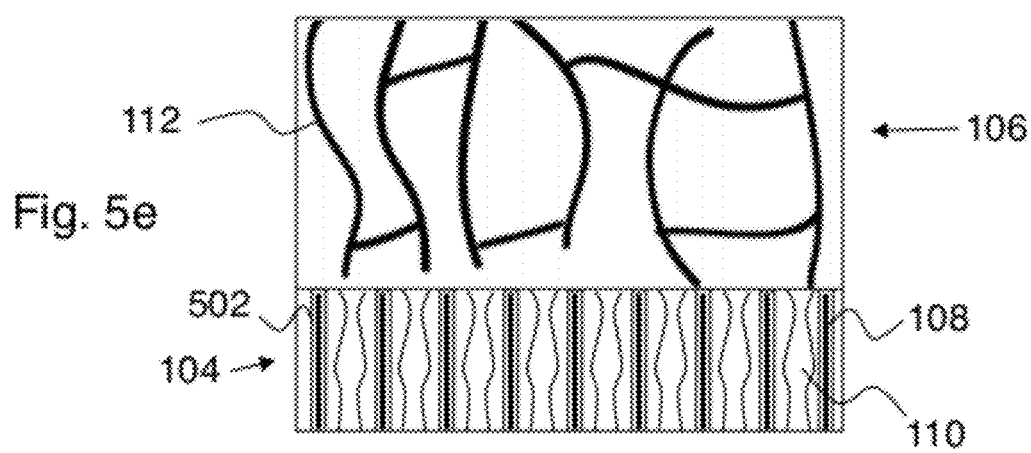

FIG. 5e shows the result of removing substrate 402 from the structure.

Figure 5F:
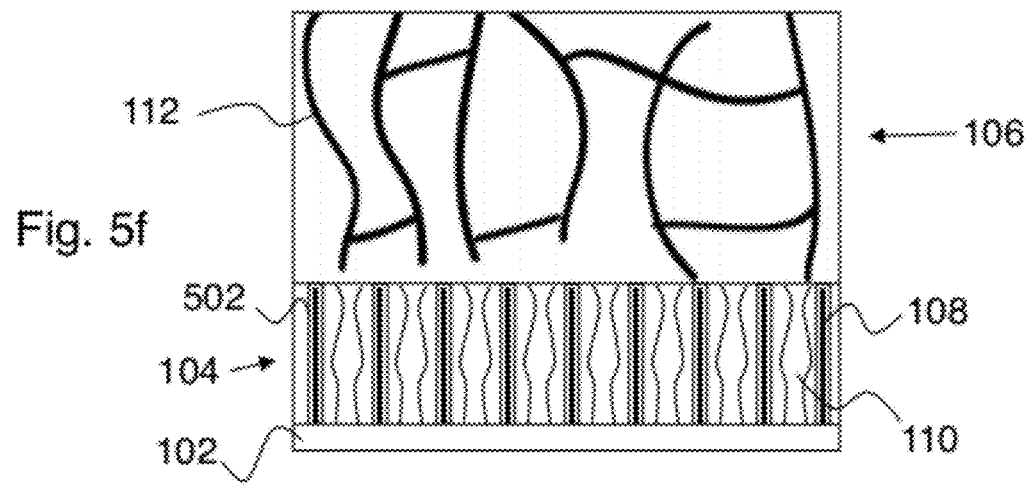

FIG. 5f shows the result of depositing active layer 102 on the exposed surface of matrix layer 104. Interfacial polymerization is a preferred approach for forming active layer 102, but any approach for depositing an active layer 102 on matrix layer 104 can be employed.

The approach of FIGS. 5a-f can significantly expand the range of polymer that can be used in matrix layer 104, because it effectively removes the strict 1-D nanoparticle compatibility requirements for the matrix polymer 105. Specifically, in connection with carbon nanotubes, the matrix polymer is no longer required to wet the carbon nanotube surface or to prevent the aligned nanotube array from collapsing under the excessive surface tension forces during infiltration. This approach opens up a way to create membranes having aligned 1-D nanoparticles with various different matrix polymers. Example 1 gives a sample protocol for membrane fabrication using m-polyaramid fill.

In some cases, it is preferred for infiltrating the matrix precursor to result in the formation of an excess layer on top of the 1-D nanoparticles (e.g., as on FIG. 5c). This excess layer can be removed partially or completely (i.e., be reduced to a predetermined thickness) prior to forming the porous support layer. Having an excess amount of material present at the infiltration stage facilitates complete infiltration of the 1-D nanoparticles.

The following description provides several illustrative examples of the above-described principles, where the 1-D nanoparticles are carbon nanotubes (CNTs).

Example 1

Fabrication of Reinforced Membrane Using Phase Inversion

Membranes in this example include an aligned carbon nanotube array partially or fully infiltrated with a polymer to form a composite layer (104 on FIG. 1a) that is supported by a porous polymer layer (106 on FIG. 1a), that may or may not include a mesh (woven or non-woven) (306 on FIGS. 3c-d). The membrane is fabricated by infiltrating the nanotube array with a polymer solution, and then using a phase inversion method to form the porous support (106 on FIG. 1a) attached to the matrix layer (104 on FIG. 1a) that contains the aligned nanotube array.

Carbon nanotubes were grown using 0.5 nm of Fe and 0.1 nm of Mo as a catalyst deposited over 30 nm of alumina on standard 4" silicon wafer. The catalyst was deposited in e-beam evaporator using very slow, 0.01-0.02 nm/s deposition rates. CNTs were synthesized at 695-720° C. catalyst annealing temperature, 90 mbar synthesis pressure, acetylene concentration 25 sccm, growth temperature 670-720° C. As-grown nanotubes were approximately 10-15 microns tall.

A 1-4 mg/mL dopamine hydrochloride (Aldrich) was dissolved in 10-50 mM Trizma-HCL buffer (Aldrich) solution of 8-10 pH range. A desired amount of the dopamine solution was then poured into a container with aligned CNT wafer. The solution was constantly and gently agitated for 10-40 minutes to polymerize dopamine to polydopamine. This procedure leaves an ultrathin polydopamine coating layer (502 on FIG. 5b) of about 5-50 nm thick around the CNTs. Then the CNT wafer was washed thoroughly with water for 30 minutes to remove excess polymer solution. The wafers were left in DI water until they were used for polymer infiltration. An optional procedure of soaking the polydopamine-CNT wafer in isopropanol for 1-4 hrs leads to thinner and more uniform polydopamine coatings on CNTs and the substrate. The isopropanol treatment also minimizes flux loses due to polydopamine coating.

A polymer solution of m-polyaramid was prepared by dissolving 5-18 wt % m-polyaramid in n-methyl pyrrolidinone solvent with 1-10 wt % lithium chloride between 70-90 deg C. under constant agitation for 1-4 hours. (Other hydrophilic or hydrophobic polymers could also be used (polysulfone, poly(vinylidene fluoride), cellulose acetate).

To prepare the membrane, excess water was squeezed off the polydopamine-CNTs wafer (after taking it out from DI water bath) either with filter paper or with a rubber roller. Then the wafer was soaked in a n-methyl pyrrolidinone bath for 1-5 minutes. Then an excess amount of the m-polyaramid polymer solution was poured onto the wafer and allowed to infiltrate for 0.5-8 hrs (thus the m-polyaramid polymer solution here is an example of 504 on FIG. 5c). The excess polymer solution was removed with an applicator/casting knife. The membranes then were transferred to a water bath to initiate phase separation process. Before phase separation the polymer-CNTs membrane can either be attached to woven/nonwoven polymer backing or used as it is, depending on the desired application. The resulting membrane was released by soaking overnight in 10% HF and rinsed in DI water.

Example 2

Fabrication of Reinforced Aligned Carbon Nanotubes Using a Parylene Porous Roof

Another approach is thin film composite membranes where the top layer of the membrane is a barrier layer supported by a thin composite layer of substantially aligned carbon nanotubes bound in a permeable polymer matrix that is fabricated with the use of a porous roof. Without losing any generality, an example of this layer is a vertically-aligned carbon nanotube layer with diameters ranging from 0.5 nm to 5 nm. The nanotubes in this example are bound by a vapor-deposited poly-xylene (parylene) polymer. The poly-xylene layer can fill the majority of the interstitial space of the CNT array or that interstitial space could be filled by the composite of poly-xylene and another polymer, such as PDMS, epoxy, m-polyaramide, polysulfone, polyethersulfone, poly(vinylidene fluoride), or cellulose acetate. The thin nanotube polymer layer (e.g., 104 on FIG. 1a) is attached to a more porous support layer (e.g., 106 on FIG. 1a) that is composed either of a polymer or of a polymer reinforced with mesh backing (woven or non-woven). Carbon nanotubes provide enhanced permeability to the top layer of the membrane, define pore opening size distribution, provide mechanical reinforcement, and determine the rejection properties of the membrane. This reinforced membrane can be also modified with additional chemical processes, or with an additional top layer (e.g., 102 on FIG. 1a) that would provide additional or modified rejection properties to the membrane as detailed in Examples 3 and 4.

Figure 6A:
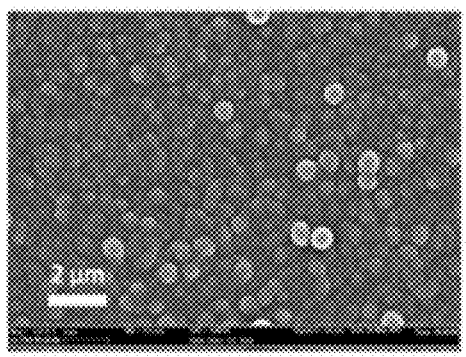
FIGS. 6a-b show SEM images relating to the roof layer fabrication approach.
Figure 6B:
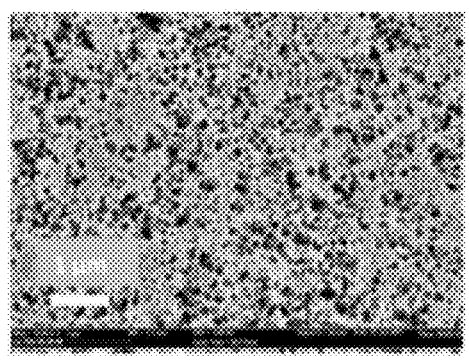

Carbon nanotubes were grown as described in Example 1. The resulting array of vertically aligned CNTs was covered with 30 nm of parylene (type C) to form a roof layer (e.g., 406 on FIG. 4b). A top view image at this stage of the process is given in FIG. 6a. However, as much as 1000 nm of parylene may be deposited. Pores in the parylene layer can be created if necessary using $O_2$ or $CF_4/O_2$ plasma etch (50-100 W for 5-10 minutes). FIG. 6b shows an image of the parylene roof layer after this plasma etching.

The CNT array covered by parylene roof layer was infiltrated with a PDMS solution (e.g., 408 on FIG. 4c) for 6-12 hours. Hexane, in ratio 2:1 to 5:1 was added to reduce PDMS solution viscosity and improve infiltration. Infiltration was enhanced by treating the sample in an ultrasound bath for 1-2 hours.

Figure 7A:
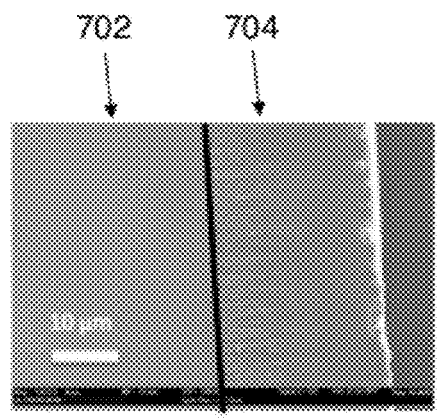
FIGS. 7a-b show further SEM images relating to the roof layer fabrication approach.
Figure 7B:
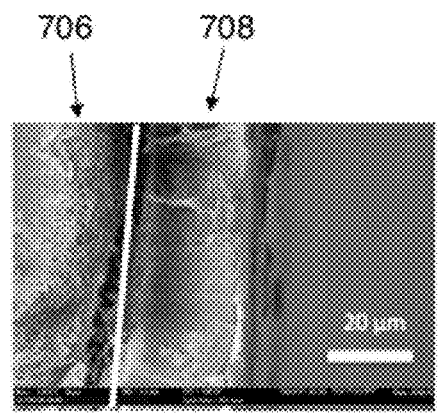

Any excess of PDMS on the top of the parylene roof layer was gently removed by wiping with soft paper. One of the functions of the parylene roof layer is holding the carbon nanotube array and preventing its destruction during this wiping procedure. Infiltrated polymer was cured at 70-130° C. for 1-12 hours to form matrix layer 104. An SEM image of the PDMS infiltration is shown on FIG. 7a. Here 702 is the substrate and 704 is matrix layer 104. A black line is added to FIG. 7a to show the interface between these two regions. FIG. 7b shows an image of a similar structure where Pelco Eponate® 12 is used for infiltration instead of PDMS. Here 706 is a Nomex® porous support layer 106 and 708 is matrix layer 104. This membrane had an added Nomex® porous support layer 106 that was described in Example 1. A white line is added to FIG. 7b to show the interface between these two regions.

A reinforcing polymer mesh (e.g., 106 on FIG. 1a) was gently melted on the top of CNT forest/polymer mixture and the resulting membrane was released in 10% HF (typically within 20-60 min of placing the sample in HF solution).

After releasing, the membrane was washed in water (5-10 min), dried in vacuum (10-100 mbar) and the catalyst residue from wafer side was etched for 1-5 min by $O_2$ plasma using 50-100 W power.

The resulting membranes have high gas permeability and Knudsen gas selectivity, which indicates the absence of large size pores.

Example 3

Fabrication of IP Coating on Top on the Reinforced CNT Membrane

A thin polyamide rejection layer (e.g., 102 on FIG. 1a) on polymer nanotube matrix membrane (e.g., 104 on FIG. 1a) can be formed by performing the interfacial polymerization (IP) procedure using the following recipe.

Aqueous Phase:
 1-3 wt % 1,3 phenylenediamine (MPDA), 0-3 wt % of 3,5 diaminobenzoic acid (DABA), 0.5-2 wt % triethylamine (TEA), 0.5-3 wt % sodium dodecylbenzenesulfonate (SDBS), and 5-8 wt % camphor-10-sulfonic acid (CSA) and 0.5-4 wt % sodium hydroxide in water stirred for 1 hr before use.

Organic Phase:
 0.05-0.2 wt/vol benzenetricarbonyl trichloride (TMC) in 0-100 vol % hexanes and 0-20 vol % of chloroform in 0-100 vol % Isopar G solution stirred for 1 hr before use.

Interfacial Polymerization (IP) Procedure:
 Aligned CNTs membrane (e.g., 104 on FIG. 1a) with porous polymer membrane support (e.g., 106 on FIG. 1a) was partially dried for about 1-5 minutes. The partially-dried CNT-membrane was fixed to a frame and a small amount of aqueous phase solution was spread on its surface and agitated for 1-5 minutes, after which the solution was drained and squeezed off. Next, the saturated CNT-polymer support membrane was covered with excess organic solution for 1-3 minutes. The excess organic solution was drained off and the membrane was cured in an oven between 60-150° C. for 1-10 minutes to form an ultrathin polyamide film (e.g., 102 on FIG. 1a) on the membrane surface.

All the thin film membranes were washed with water to remove unreacted chemicals prior to storage and/or use.

Example 4

Fabrication of $CO_2$ Selective Coating on Top of the Reinforced CNT Membrane

After the membrane including aligned CNT layer 104 and porous support layer 106 was prepared as described in the previous examples, the top surface was coated with poly (trimethylsilyl)pentyne (PTMSP). The thin polymer layer was deposited by spin coating the PTMSP dissolved in cyclohexane (0.5-20 mg/mL) at 1000 rpm. The composite membrane was treated with oxygen plasma (5 seconds @20 mW) and then coated with Pebax® 1657 (0.05-1 wt % in 70:30 EtOH:$H_2O$) using the same spin coating method. The resulting structure is as shown on FIG. 1a, with active layer 102 being the PTSMP and Pebax® 1657 layer.

The membrane prepared with this recipe showed high selectivity to $CO_2$ over $N_2$ and high flux.

TABLE 2

Gas permeability and selectivity of modified aligned CNT membranes.

| | $CO_2$ Flux (GPU) | $N_2$ Flux (GPU) | $CO_2/N_2$ selectivity |
|---|---|---|---|
| Membrane1 | 1090 | 77 | 14 |
| Membrane2 | 931 | 24 | 39 |

Here Membrane1 and Membrane2 are two samples having the above-described structure.

The preceding description has been by way of example as opposed to limitation, so many variations and elaborations of the above-described principle also constitute practice of the invention. For example, ultrasonic welding or thermal welding or gluing can be used to seal the membrane within a plastic carrier using a polymeric washer layer. The function of the "washer" layer is to prevent the membrane from cracking during handling from contact with a sharp edge of the main plastic carrier.

The invention claimed is:
1. A permeable membrane comprising:
  a porous support; and
  a matrix disposed on the porous support, the matrix comprising:
    a porous polymer; and
    a plurality of 1-D nanoparticles disposed throughout the porous polymer, wherein the 1-D nanoparticles are substantially vertically aligned, and wherein the 1-D nanoparticles substantially extend through the matrix.
2. The membrane of claim 1, wherein the 1-D nanoparticles are selected from the group consisting of: open-ended carbon nanotubes, close-ended carbon nanotubes, carbon fibers, nanowires, nanorods, nanotubes, and combinations thereof.

3. The membrane of claim 1, wherein a thickness of the matrix is from about 100 nm to about 100 μm.

4. The membrane of claim 1, further comprising a woven or non-woven fabric or mesh disposed in the porous support.

5. The membrane of claim 1, further comprising one or more anti-fouling materials disposed on the another polymer, the porous support, or both.

6. The membrane of claim 1, wherein the porous support layer includes a porous roof layer on the 1-D nanoparticles.

7. The membrane of claim 1, wherein the 1-D nanoparticles are coated with a conformal polymer.

8. The membrane of claim 1, wherein the membrane further comprises:
  another polymer disposed on the matrix, wherein the another polymer and the porous polymer have different compositions; and
  wherein the another polymer provides species-specific fluid transport.

9. The membrane of claim 8, wherein a thickness of the another polymer is from about 0.3 nm to about 500 nm.

10. The membrane of claim 8, wherein the another polymer is a gas-selective polymer.

11. The membrane of claim 8, wherein the another polymer is configured for solvent-solute separation.

12. The membrane of claim 1, wherein pores in the porous polymer are configured to allow transport through the membrane.

13. A method of making a permeable membrane, the method comprising:
  forming vertically aligned 1-D nanoparticles on a substrate;
  infiltrating a matrix precursor between the 1-D nanoparticles; and
  forming a porous polymer matrix from the matrix precursor to provide a matrix comprising the porous polymer matrix and the vertically aligned 1-D nanoparticles, wherein the 1-D nanoparticles substantially extend through the matrix.

14. The method of claim 13, wherein the 1-D nanoparticles are selected from the group consisting of: open-ended carbon nanotubes, close-ended carbon nanotubes, carbon fibers, nanowires, nanorods, nanotubes, and combinations thereof.

15. The method of claim 13, further comprising:
  depositing a porous roof on the 1-D nanoparticles after said forming vertically aligned 1-D nanoparticles and prior to said infiltrating a matrix precursor, wherein the substrate and roof are vertically separated.

16. The method of claim 13, further comprising:
  depositing a conformal polymer on the 1-D nanoparticles after said forming vertically aligned 1-D nanoparticles and prior to said infiltrating a matrix precursor.

17. The method of claim 13, further comprising:
  forming a porous support on the matrix;
  separating the matrix from the substrate; and
  forming a barrier on an exposed surface of the matrix, wherein the barrier is configured to provide species-specific fluid transport.

18. The method of claim 17, wherein said forming a barrier comprises using interfacial polymerization.

19. The method of claim 17, wherein the infiltrating a matrix precursor results in formation of an excess material on the 1-D nanoparticles, and wherein the excess material is reduced to a predetermined thickness prior to said forming a porous support.

20. The method of claim 17, wherein the porous polymer matrix and the porous support are formed using a single phase inversion process.

21. The method of claim 17, wherein the porous polymer matrix and the porous support are formed by distinct phase inversion processes.

22. The method of claim 13, wherein said forming a porous polymer matrix comprises using phase inversion to form the porous polymer matrix.

23. The method of claim 13, wherein said forming a porous polymer matrix comprises forming a porous polymer matrix having pores configured to transport species through the membrane.

* * * * *